US009830307B1

(12) United States Patent
Willhoit (10) Patent No.: US 9,830,307 B1
(45) Date of Patent: Nov. 28, 2017

(54) AHEAD OF TIME COMPILATION OF CONTENT PAGES

(71) Applicant: Amazon Technologies, Inc., Seattle, WA (US)

(72) Inventor: Donald Ryan Willhoit, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 14/567,757

(22) Filed: Dec. 11, 2014

(51) Int. Cl.
*G06F 17/00* (2006.01)
*G06F 17/22* (2006.01)
*H04L 29/08* (2006.01)
*G06F 17/30* (2006.01)

(52) U.S. Cl.
CPC .... *G06F 17/2247* (2013.01); *G06F 17/30905* (2013.01); *H04L 67/10* (2013.01)

(58) Field of Classification Search
CPC .................................................. G06F 17/30905
See application file for complete search history.

(56) References Cited

U.S. PATENT DOCUMENTS

| | | | | |
|---|---|---|---|---|
| 5,881,289 A * | 3/1999 | Duggan | ................... | G06F 9/547 714/38.14 |
| 6,421,717 B1 * | 7/2002 | Kloba | ............... | G06F 17/30902 707/E17.12 |
| 6,453,465 B1 * | 9/2002 | Klein | ........................ | G06F 8/41 704/9 |
| 6,496,979 B1 * | 12/2002 | Chen | ........................ | G06F 8/61 717/178 |
| 6,615,253 B1 * | 9/2003 | Bowman-Amuah | ............. | G06F 17/30902 707/999.1 |
| 6,845,394 B2 * | 1/2005 | Ritche | ........................ | G06F 8/60 709/221 |
| 7,200,809 B1 * | 4/2007 | Paul | ................... | G06F 17/30893 707/E17.117 |
| 7,210,121 B2 * | 4/2007 | Xia | ........................... | G06F 8/60 717/106 |
| 7,340,730 B2 * | 3/2008 | Arkwright | .......... | G06F 9/45516 709/203 |
| 8,209,709 B2 * | 6/2012 | Fleming | ................... | G06F 9/541 719/318 |
| 2004/0143823 A1 * | 7/2004 | Wei | ........................... | G06F 8/41 717/140 |

(Continued)

*Primary Examiner* — Mohammed-Ibrahim Zuberi
(74) *Attorney, Agent, or Firm* — Knobbe Martens Olson & Bear LLP (57) ABSTRACT

Systems and methods are described which provide improved memory and resource allocation for content pages accessed using a browser. A content page may be accessed and compiled into machine code, such as executable files or an application. The machine code may then be executed on a user device in a process separate from the browser to cause display of the content page, such as in a standalone application. Content pages may be pre-compiled and provided in response to user requests to access the content pages. A content page may be compiled faster than the browser may process the native content page, and the compiled machine code may require less memory than the native content page and associated resources. In some embodiments an intermediary system may be used to perform content page compilation and may provide the compiled machine code, instead of the native content, to the user device.

26 Claims, 7 Drawing Sheets

(56) References Cited

U.S. PATENT DOCUMENTS

| | | | |
|---|---|---|---|
| 2006/0248506 A1* | 11/2006 | Luo | G06F 8/38 717/104 |
| 2007/0061486 A1* | 3/2007 | Trinh | G06F 17/30905 709/246 |
| 2007/0061488 A1* | 3/2007 | Alagappan | G06F 17/30905 709/246 |
| 2007/0300217 A1* | 12/2007 | Tunmer | G06F 8/38 717/177 |
| 2008/0016182 A1* | 1/2008 | Sathish | H04L 67/30 709/219 |
| 2008/0139191 A1* | 6/2008 | Melnyk | G06F 17/30905 455/419 |
| 2008/0282172 A1* | 11/2008 | Bayang | G06F 9/4443 715/744 |
| 2009/0119678 A1* | 5/2009 | Shih | G06Q 10/10 719/313 |
| 2009/0241135 A1* | 9/2009 | Wong | G06F 9/4443 719/328 |
| 2009/0249076 A1* | 10/2009 | Reed | G06Q 30/00 713/181 |
| 2010/0174607 A1* | 7/2010 | Henkin | G06Q 30/02 705/14.53 |
| 2010/0241664 A1* | 9/2010 | LeVasseur | H04M 7/0027 707/779 |
| 2010/0281475 A1* | 11/2010 | Jain | G06F 8/68 717/172 |
| 2011/0072086 A1* | 3/2011 | Newsome | G06F 17/30905 709/204 |
| 2011/0083069 A1* | 4/2011 | Paul | G06F 8/60 715/234 |
| 2011/0113090 A1* | 5/2011 | Peeri | G06F 9/4443 709/203 |
| 2011/0154305 A1* | 6/2011 | LeRoux | G06F 8/71 717/140 |
| 2011/0320525 A1* | 12/2011 | Agarwal | H04M 1/72561 709/203 |
| 2012/0072926 A1* | 3/2012 | Woo | G06F 9/4443 719/328 |
| 2012/0130801 A1* | 5/2012 | Baranov | G06Q 30/02 705/14.43 |
| 2012/0137211 A1* | 5/2012 | Lewontin | G06F 17/30914 715/236 |
| 2012/0137233 A1* | 5/2012 | Lewontin | G06F 17/30905 715/760 |
| 2012/0158893 A1* | 6/2012 | Boyns | G06F 17/30905 709/217 |
| 2012/0159308 A1* | 6/2012 | Tseng | G06F 9/4443 715/234 |

* cited by examiner

AHEAD OF TIME COMPILATION OF CONTENT PAGES

BACKGROUND

When a user requests a web page or other content page via a browser, the user typically experiences a noticeable delay and an increase in computer memory usage before the page is fully or even partially displayed. Various factors can contribute to the delay and/or increased memory use. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), or when the memory usage increases, the task of browsing can be frustrating for users.

BRIEF DESCRIPTION OF DRAWINGS

The drawings are provided to illustrate example embodiments described herein and are not intended to limit the scope of the disclosure.

DETAILED DESCRIPTION

Introduction

Conventionally, a browser implemented on a user device will perform three actions to render a content page (e.g., a web page) for display to the user. First, for a given uniform resource locator (URL), the browser will download the page content including HTML (Hypertext Markup Language) coding and any other content such as images or video. Second, the browser will render the content into a document object model (DOM) representation of the page. The DOM is an object-oriented interface supported by most popular web browsers through which a displayed content page can be accessed and manipulated. The DOM provides a structured graph representation of a content page with nodes that represent each HTML tag. Third, the browser will render the DOM into visualized content for display. However, implementing the browser entirely on the user device can result in significant delays for page loads, for example in mobile devices having limited computing resources. In mobile devices, content page rendering can additionally cause a significant drain on battery life.

One method for reducing content page memory consumption and load times is to compile the content page into machine code (e.g., an executable file or an application) which can be executed by an operating system. The present disclosure involves an architecture in which a browser component running on a user device is configured to retrieve content (e.g., web pages) on behalf of the user device, and generate, for execution by the user device, a compiled machine code representation of the content page. The browser component can process the native content to identify one or more resources, optionally including additional code libraries which may be linked in during the compilation process, and generate an executable file or application for execution by, for example, operating system software installed on the user device. For example, the compiled machine code may comprise instructions and/or data for the operating system software installed on the user device and/or operably coupled to the browser component. The browser component may then execute the instructions and/or utilize the data to invoke the operating system software to generate or render user interactive elements, without the need to perform any further processing of the native requested content. Thus, the content page may be executed as a process separate from the process executing the browser component.

One benefit to this architecture may be that certain mechanisms and processes, such as security management and resource optimization, may be offloaded from the browser component to the operating system itself. Another benefit may be that code written in programming languages not traditionally used in web-based content pages, such as C, C++, and others, may be leveraged directly by linking in required code libraries and components during the compilation process. Another benefit may be that content pages which are processed and compiled in accordance with the disclosure herein may not necessarily have to support all web standards, since the content page is compiled and executed as a separate executable or application rather than a conventional browser. Relatedly, traditional developer tools used to develop native applications may also be used by developers of content pages in order to develop native applications for a variety of platforms using web technologies.

In addition, for at least some types of content pages and content, the above process results in reduced memory requirements and "page-load" times as experienced by users. This reduction is due in-part to the reduced or eliminated need for the client browser to process or maintain in memory the page coding (e.g., HTML, JavaScript, CSS, etc.) and associated resources of the pages. In some cases involving an intermediary system discussed further herein, the process may also reduce the quantity of data transmitted to the user device.

In some embodiments, some of the functions provided by the browser component running on a user device may be distributed among a browser component running on a server (e.g., a server of the intermediary system) and the browser component running on the user device. In this configuration, the server-based browser component may be referred to as an "intermediary browser," and the browser component running on the user device may be referred to as a "client browser." Thus, some of the processing may be offloaded (including pre-compiling content pages ahead of time or on request by the user) to the intermediary system (e.g., a proxy system) that sits logically between the user's computing device and a system that hosts the network page or content page. For example, instead of retrieving the network page (e.g., web page) directly from the host system that hosts it, the user device can request the page from the intermediary system, which can retrieve the page's various content resources (e.g., images, text, audio, video, scripts, etc.) for the user device, The intermediary system can then compile the page, and can generate an executable file or application representing the content page. The intermediary system can then provide the compiled machine code and/or executable file or application to the user's device for execution by the user device. This approach reduces page memory consumption and load times experienced by end users. This reduction is due in part to the reduced need for the user device to handle computation-intensive page rendering and compilation tasks. Thus, presenting a compiled version of the page to a user device can result in noticeable performance improvements.

In some embodiments, changes in state for an executing content page "application" or process may be detected, such as new user interface elements which may need to be configured or displayed; and/or configured to detect user interaction data which may indicate a need for updated or new content. In response, affected portions of the content page may be re-compiled and replace the now-outdated and possibly invalid original compiled code for the content page.

The browser component may also include several sub-components configured to perform various processes in conjunction with compilation and execution of machine code for content pages. For example, the browser component may include or be configured to utilize a number or services which may be provided in party by the operating system software and/or the user device itself, such as location services. The browser component may also be pre-configured with one or more shared code libraries which may be included or referenced into compiled content pages. The browser component may also include a compositor or "window manager" which facilitates management of multiple page processes which may be running concurrently, including allocation of display space and input methods, switching between page processes, embedding of iFrames (e.g., a content page which includes an iFrame may be compiled into two different executable applications and executed in separate concurrent page processes), and the like. In one embodiment, the compositor or "window manager" may be a component, feature, or service provided by the user device and/or an operating system installed on the user device.

In some embodiments, the user device (or the intermediary system) may be configured to receive or otherwise detect information indicating a particular operating system installed on the user device and generate the compiled machine code and/or executables according to the particular operating system. That is, operating systems frequently provide different application programmatic interfaces ("APIs") to invoke different functionality, with or without various input parameters. Thus, the user device may generate compiled machine code and/or executable files for the content page that are pre-formatted according the particular APIs and input parameters required by the particular operating system. This provides further benefit and reduced latency as the user device may, upon completed processing of the content page into pre-formatted machine code and/or executable files, immediately (or upon user demand) invoke the APIs without the need to perform any additional processing.

Although aspects of the embodiments described in the disclosure will focus, for the purpose of illustration, on a distributed browsing system with separate server-based and client-based browser components designed specifically to work in conjunction with one another (e.g., a client browser instance running on a user device and, in some embodiments, an intermediary browser instance running on an intermediary server or on a non-intermediary content server), one skilled in the art will appreciate that the techniques disclosed herein may be applied to any number of services, processes, or applications. In some embodiments, an existing browser application that runs on a user device may be configured to receive compiled machine code, such as operating system executable files or applications, from a server in lieu of unprocessed content files. For example, a browser add-in or extension may be installed on a user device to facilitate communication with an intermediary browser, receive compiled machine code, and process or execute the compiled machine code, thereby bypassing the parsing/DOM tree construction/instruction generating processes that would normally be performed by the browser application. In some embodiments, browsers executing on user devices may be designed to receive either conventional content files or commands (or a combination thereof). For example, the browser may determine whether to request content files or commands based on current conditions and performance metrics, data regarding prior browsing sessions, or the like. Alternatively or in addition, an intermediary system may determine whether to provide content files or commands based on current conditions, performance metrics, prior browsing sessions, or the like.

Various aspects of the disclosure will now be described with regard to certain examples and embodiments, which are intended to illustrate but not limit the disclosure.

Example Content Page Compilation Process and Data Flow

Figure 1:
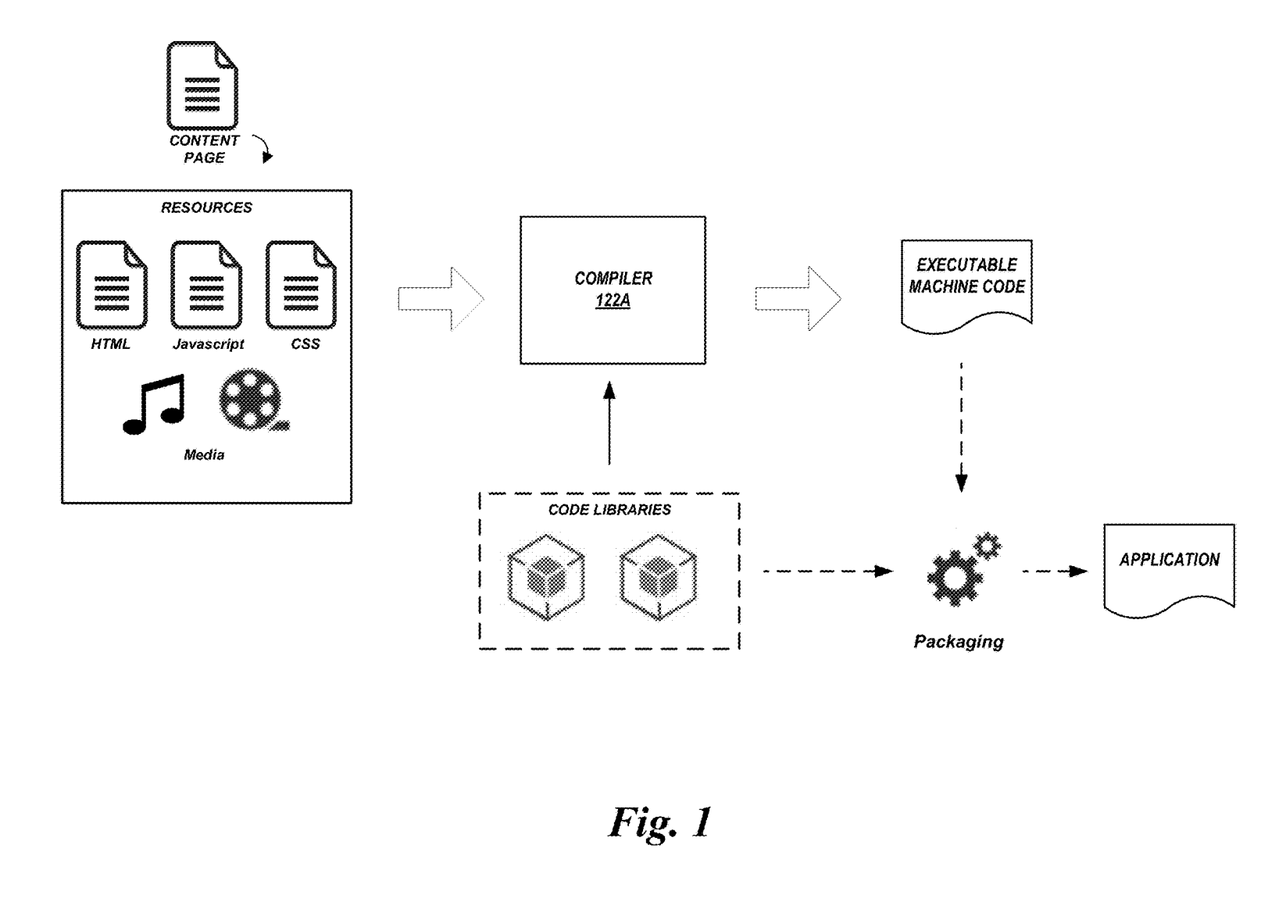
FIG. 1 is a data flow diagram illustrating how a content page may be processed and compiled into an executable or an application according to one embodiment.

FIG. 1 is a data flow diagram illustrating how a content page may be processed and compiled into an executable or an application according to one embodiment. As the diagram illustrates, a content page may include or be associated with various resources such as HTML files, JavaScript files, cascading style sheet ("CSS") files, animations, images, text, links, and/or media files (e.g., music and/or video content). Each of these resources may be identified and accessed in order to be provided to a compiler 122A.

The compiler 122A receives the content page and associated resources and compiles them into machine code such as an executable file or application. As part of this process the compiler 122A may be configured to determine a platform associated with the user device on which the machine code is to be executed. The platform may include, for example, information about the type of device (e.g., whether it is a laptop computing device, tablet computing device, electronic reader device, smartphone, other mobile device, or any other type of device described herein), information about the operating system installed on the device, and/or information about language runtimes which may be available on the device. The compiler 122A may optionally access and include various code libraries to be compiled with the content page. The code libraries to be included may be based in part on the platform associated with the user device. The code libraries to be included may be specified in part by the content page itself. For example, a developer of the content page may include instructions to reference in one or more code libraries, and those instructions may further include instructions to reference particular code libraries depending on the platform of the user device requesting the content page.

As FIG. 1 illustrates, the output of the compiler 122A may be executable machine code. The executable machine code may be provided to the user device in any format that may be appropriate for execution by the user device. For example, in some embodiments, the executable machine code may comprise one or more executable files (e.g., ".exe," ".bin," and the like), binary code, a list or stream of instructions, and so on.

Further, as shown in FIG. 1, the executable machine code may be further processed and/or optionally packaged or combined with additional code libraries into an application ("app"). The application may be formatted, for example, to support direct installation and/or execution on the user device. For example, the application may be a mobile application in any format usable by modern mobile operating systems (e.g., an iOS app or ".ipa" file, an Android app or ".apk" file, and so on). Thus, in some embodiments, content pages may be accessed and pre-compiled (for example, by the intermediary system 104 shown in FIG. 3) into standalone applications which may then be accessed, installed, and used by the user instead of the native content page.

Example System Architectures

Figure 2:
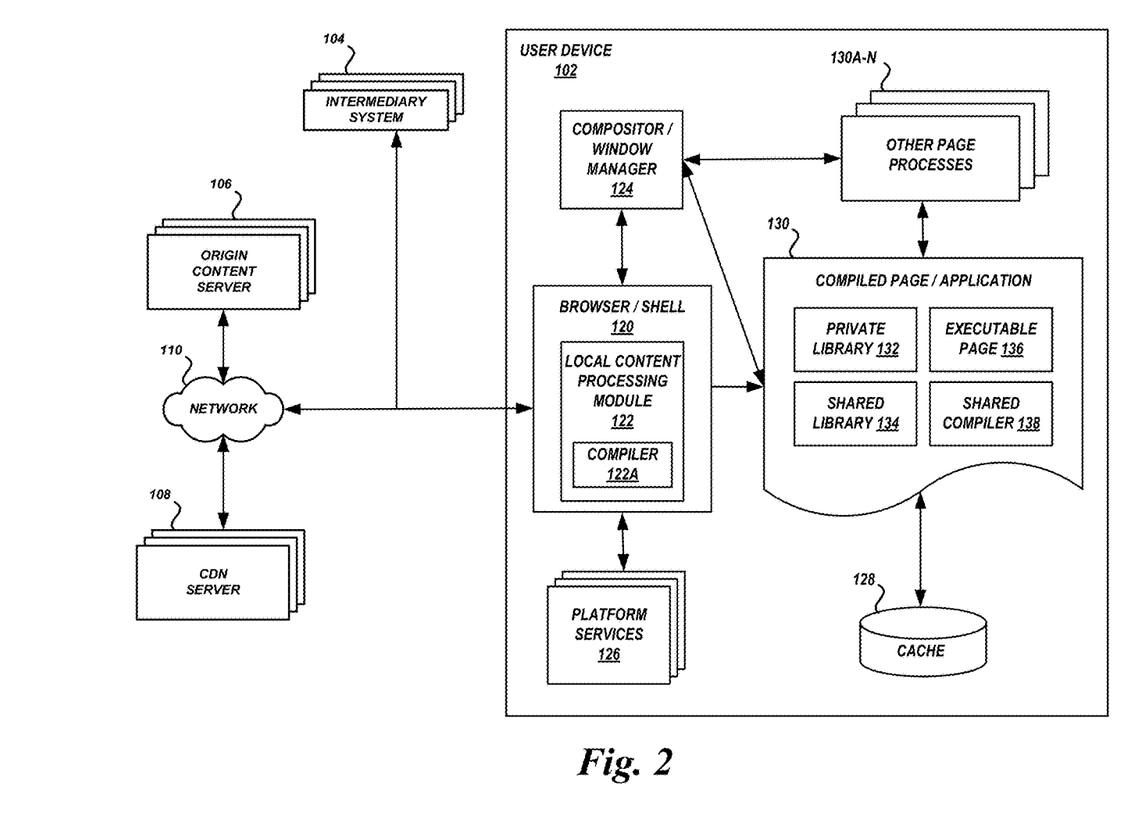
FIG. 2 illustrates a user device configured with a browser that processes content and generates compiled content pages for execution on the user device according to one embodiment.

FIG. 2 illustrates a user device configured with a browser that processes content and generates compiled content pages for execution on the user device according to one embodiment. The network environment shown in FIG. 2 includes a user devices 10 and various content sources, including origin content servers 106 and content delivery network ("CDN") servers 108 (discussed in more detail below with reference to FIG. 3). The system components may communicate with each other via one or more communication networks 110.

The user device 102 may include various modules, components, data stores, and the like to provide the content retrieval and processing functionality described herein. For example, user device 102 may include a client-based browser/shell application 120 or some other content rendering application to process content retrieved from content sources.

Illustratively, a user may use a browser/shell 120 to request network-accessible content (e.g., content pages, images, video, etc.) hosted or provided by a content source, such as an origin content server 106 or a CDN server 108. The browser/shell application 120 may include a local content processing module 122 that accesses content pages and compiles them, for example via a compiler 122A, into executable machine code. In other embodiments, such as the example shown in FIG. 3, the browser/shell application 120 may access compiled version of content pages (e.g., as compiled ahead of time and/or responsive to access requests, such as by the intermediary system 104 or content servers 106, 108). The local content processing module 122 (or some other module of the browser/shell application 120) can then cause execution of the compiled machine code, in a separate process from the browser/shell application 120, to display a representation (e.g., a standalone application) of the requested content on the user device 102. Among other things, the local content processing module 122 may set up various permissions and limitations which may be used to enforce specific security policies, as well as provide standard inter-process communication ("IPC") channels and services, such as a socket pair, a pipe, a named pipe, a shared memory, or a message queue, to facilitate communication among multiple page processes. IPC protocols may be used to, for example, enable communication between multiple compiled content pages which are executing as separate processes, as well as communication between the executing page processes, the browser/shell 120, and/or a compositor/window manager 124 discussed below.

In some embodiments, the browser/shell 120 may be a conventional web browser that is not specifically designed or configured to execute remotely-generated compiled machine code and other executable files. For example, the browser/shell 120 may use or otherwise be associated with a local content processing module 122 that is not integrated with the browser/shell 120, such as a browser add-in or extension. In some embodiments, applications other than a browser/shell 120 may include or use a local content processing module 122 (or some similar module) to execute compiled machine code. For example, content aggregators or other specialized content display applications for mobile devices (e.g., Flipboard) may utilize a local content processing module 122.

The user device 102 (or, in some embodiments, the browser/shell 120) may also include a compositor/window manager 124 which can manage multiple page processes (e.g., a compiled page/application 130 and other page processes 130A-N) which may be running concurrently, including allocation of display space and input methods, switching between the page processes, managing embedded iFrames (e.g., a content page which includes an iFrame may be compiled into two different executable applications and executed in separate page processes), and the like.

The browser/shell 120 may be in communication with one or more platform services 126, such as may be associated with the user device 102 and/or operating system software installed on the user device. Platform services may include, for example, location services, network communication services, security mechanisms, code libraries and frameworks, and the like.

FIG. 2 further illustrates one example of a compiled page/application 130 representing a compiled content page ready for execution on the user device as a separate process from the browser/shell 120. The compiled page/application 130 may specific, for example, a UID for the content page to be accessed, compiled, and executed. The compiled page/application 130 may include one or more optional components, including for example a private library 132 which includes program code associated with or included in the compiled machine code for the content page; a shared library 134 which includes program code associated with multiple content pages (e.g., a plurality of content pages associated with a single web service may utilize a shared library 134); an executable page 136 which may include the compiled machine code for the content page; and a shared compiler 138 which may be configured to facilitate dynamic loading of the executable page when the page process is caused to be executed. As previously described, multiple other page processes 130A-N may also be executing (concurrently or otherwise) which the compiled page/application 130 may be in communication with.

The environment shown in FIG. 2 also includes a cache 128, which may be utilized to for storage and access of cached content (either native or compiled), cookies, and other database content as may be used by the compiled page/application 130 during execution of the compiled content page.

When a compiled content page is executed, links within a content page to other content pages may be handled in various ways depending, for example, on the nature of any particular link. For example, a local link, which may include links to content within the same content page or links to content accessible from a same content server from which the content page was accessed, may be handled within or by the same executing page process. An external link, which may include links to content external to the content page or accessible from a different content server from which the content page was accessed, may trigger execution of, or a request to execute, a new process separate from the executing page process. For example, user selection of an external link may cause a first executing page process to transmit a request (e.g., using IPC or similar communication protocol) to the browser/shell 120 to trigger a request to execute another page process corresponding to the external link. The browser/shell 120 may then access and compile the external link content page (or access a pre-compiled version) and execute the compiled version of the external link content page in a new process. Or, the first executing page process may transmit a request to the compositor/window manager 124 to switch to another page process which may already be executing.

Some of all of the link analysis functionality described above may be implemented by the compiler 122A, which, for example, may analyze a link within a content page to determine whether local or external processes may need to be invoked when the link is selected, and compile the link into appropriate machine code to invoke the proper process. The machine code to invoke the proper process may depend, for example, on the target platform associated with the user device 102, including a particular application programming interface ("API") or other function calls used to interface with the operating system installed on the user device 102. In some instances, a content page, its associated metadata, and/or links within the content page may include or specify origin or security policy information which may indicate whether cookies and other data may be shared among multiple content pages. Such origin or security policy information may be analyzed by the compiler 122A and used to determine the proper API or parameter, including for example whether selection of a link may be processed within the same page process or trigger execution of another page process. In another example, some page processes may be grouped together during execution based on a shared origin or security policy.

Figure 3:
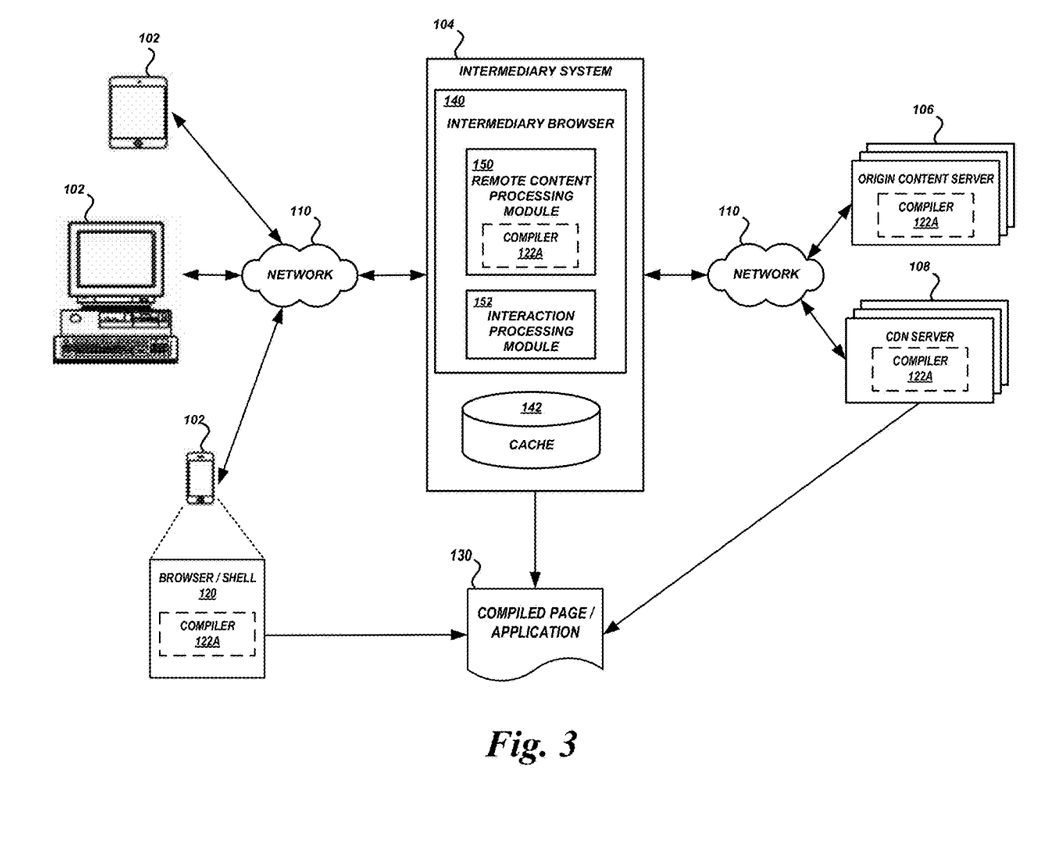
FIG. 3 illustrates a content delivery environment with an intermediary system that processes content and generates compiled content pages for execution on user devices according to one embodiment.

FIG. 3 illustrates an example network environment in which features can be implemented for processing content pages and generating compiled machine code for execution at a user device. The network environment shown in FIG. 3 includes various user devices 102, an intermediary system 104, and various content sources, including origin content servers 106 and content delivery network ("CDN") servers 108. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, a network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser/shell application 120 to communicate via the network 110 with other computing systems, such as the intermediary system 104 or content sources 106 and 108, in order to request and display content. The user device 102 or browser/shell application 120 may be associated with the intermediary system 104 or otherwise configured to request the content through, and receive compiled content page machine code from, the intermediary system 104 rather than communicating directly with the content source. Advantageously, in some embodiments the local content processing module 122 may facilitate the display of graphical representations of requested content at the user device 102 without requiring the user device 102 to receive content files (e.g., HTML files, JPEG images, etc.) directly or indirectly from content sources 106 and 108.

The intermediary system 104 can be a computing system configured to retrieve content on behalf of user devices 102 and generate compiled machine code representing content pages for execution by the user devices 102. For example, the intermediary system 104 can be a physical server or group of physical servers that may be accessed via the network 110. In some embodiments, the intermediary system 104 may be a proxy server, a system operated by an internet service provider (ISP), or some other device or group of devices that retrieve content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as an "intermediary browser" 140. Generally described, an intermediary browser 140 does not (or is not required to) cause display of content by a graphical display device of the server that on which the intermediary browser 140 is executing. Instead, the intermediary browser 140 provides compiled machine code (including executable files and/or applications) representing content pages to separate user devices 102. Illustratively, the intermediary browser 140 may obtain requested content from an origin content server 106 and/or CDN server 108, obtain additional items (e.g., images and executable code files) referenced by the requested content, analyze resources (e.g., JavaScript, style sheets, media content, and the like) that may be included in or referenced by the content, generate compiled machine code based on the requested content and resources, and transmit the compiled machine code to the user device 102. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability.

The intermediary browser 140 may include various modules to provide the functionality described above and in greater detail below. For example, the intermediary browser 140 may include: a remote content processing module 150 that parses content files and generates a compiled machine-code representation of the content; and an interaction processing module 152 that communicates with the browser/shell 120 to receive information regarding detected state changes and/or interactions with the content at the user device 102 and to update the compiled machine code of the content if necessary. In some embodiments, an intermediary browser 140 may include additional or fewer modules than those shown in FIG. 3.

The intermediary system 104 may include additional modules, components, data stores, and the like to provide the features described above and in greater detail below. For example, the intermediary system 104 may include a cache 142 that stores content items received form content sources 106 and 108, compiled content pages or resources generated or accessed by the intermediary browser 140, information about user requests and interactions with content, and the like.

As FIG. 3 further illustrates, a compiler 122A may be included on any or each of the user devices 102, intermediary system 104, and content sources 106 and 108. Each of these systems and devices may implement the compiler 122A to perform the content page compilation processes described herein and, among other things, generate a compiled version of a content page 130 (e.g., executable machine code, an application, etc.). The compiled page/application 130 may then be accessed by or provided to a user device 102, which can then cause execution of the content page/application 130 as a separate or standalone process. For example, in one embodiment, the compiler 122A may be implemented by the browser/shell 120 on the user device 102, whereby accessed content pages may be compiled locally on the user device 102. In another embodiment, the compiler 122A may be implemented by the remote content processing module 150 on the intermediary system 104, whereby content pages may be compiled responsive to requests for content pages received from the user device 102. In another embodiment, the compiler 122A may be implemented by the content sources 106 and 108, whereby content pages may be compiled ahead of time or in response to requests for content pages received from the user device 102 or the intermediary system 104. For example, content sources 106 and 108 may implement the compiler 122A to compile content pages into standalone applications which can then be accessed (e.g., from an application store or repository) and installed on the user device 102.

Example Content Page Compilation Process

Figure 4:
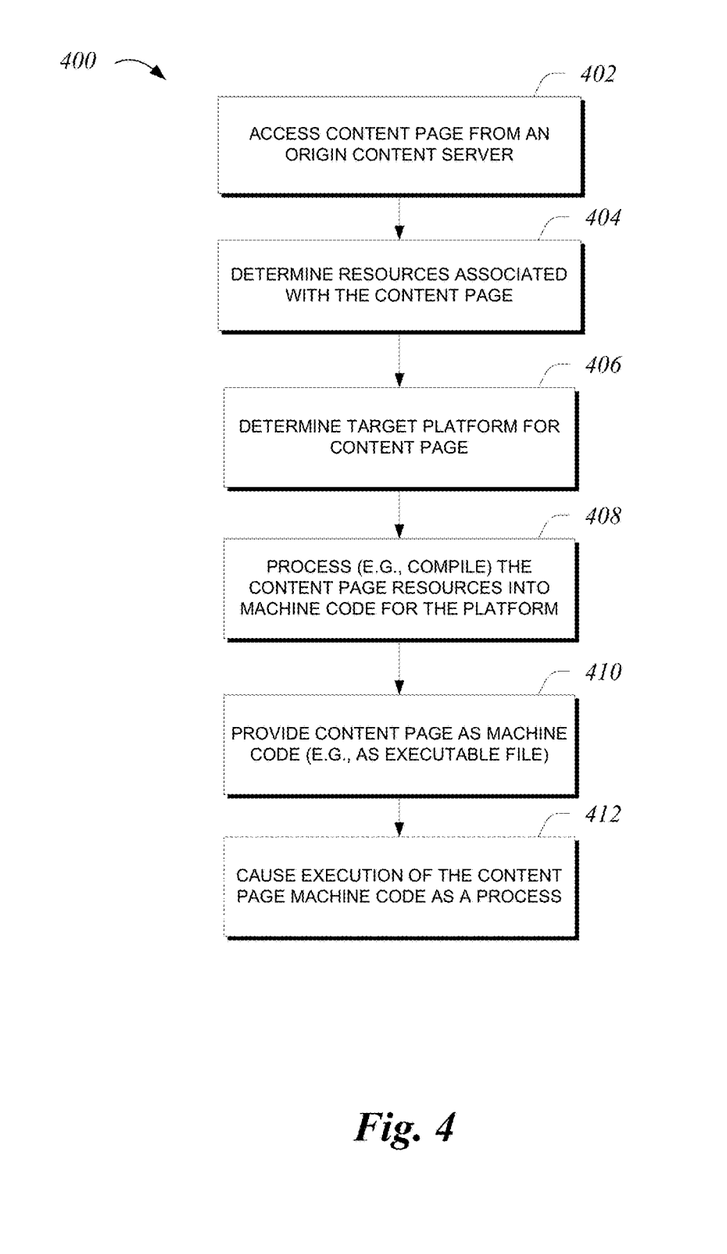
FIG. 4 is a flowchart of an embodiment of a content page compilation process as implemented by a user device, such as the user device of FIG. 2, or by an intermediary system, such as the intermediary system of FIG. 3.

FIG. 4 is a flowchart of an embodiment of a content page compilation process 400 which may be implemented by, for example, the user device 102 of FIG. 2 or (more typically) the intermediary system 104 of FIG. 3. The process 400 can be implemented by any system that can access the content page and generate an executable representation (e.g., compiled machine code, a standalone application, etc.) of the content page. For example the process 400, in whole or in part, can be implemented by a user device 102, a browser/shell 120, a local content processing module 122, a compiler 122A, an intermediary system 104, an intermediary browser 140, a remote content processing module 150, an origin content server 106, or a CDN server 108, to name a few. Although any number of systems, in whole or in part, can implement the process 400, to simplify the discussion, portions of the process 400 will be described with reference to particular systems. Further, although the process 400 is primarily described with respect to the user device 102 or the intermediary system 104 and their associated subsystems, in some embodiments the process 400 may be performed by a host system of a content page, such as an origin content server 106.

The process 400 begins at the block 402 where a content page is accessed (for example, by the user device 102 or the intermediary system 104) from a corresponding origin content server 106. Alternatively, or in addition, the content page or portions thereof may be accessed from one or more CDN servers 108. The content page or portions thereof may also be accessed from a cached or local copy that may be stored in the user device's cache 128 (or in the intermediary system's cache 142). The content page may be accessed using, for example, an identifier of the content page (e.g., a URL or URI) within a network (e.g., the Internet).

At block 404, the process 400 determines one or more resources associated with or included in the content page. Resources may include, for example, HTML files, JavaScript files, cascading style sheet ("CSS") files, animations, images, text, links, Active Server Pages (ASP), and/or media files (e.g., music and/or video content). The content page comprises associated metadata descriptive of content and resources included in the content page, and may be used to determine the one or more content resources associated with the content page. The metadata may also specify and be used to determine one or more code libraries which are to be referenced, linked, included, or otherwise compiled with the content page. For example, the metadata may specify one code library to include for a first particular platform, and another code library to include for a second particular platform, and so on.

At block 406, the process 400 determines a target platform for the content page. The target platform may specify, for example, at least a device type of the user computing device and an operating system installed on the user computing device. The device type may further specify or be used to determine a screen resolution of the user computing device; processing, memory, and storage capabilities of the user computing device; and other hardware capabilities. The platform may be determined by accessing or receiving device attributes associated with the user device. Some of the device attributes may be included with a request for the content page. The device attributes may include, for example, information about the type of device (e.g., whether it is a laptop computing device, tablet computing device, electronic reader device, mobile device, or any other type of device described herein), information about the operating system installed on the device, and/or information about language runtimes which may be available on the device.

At block 408, the process 400 processes (e.g., compiles) the content page, including some or all of the determined resources for the content page, into machine code for the target platform. For example, the machine code may be generated as an executable file or application configured to run according to the target platform for the user device.

Thus, the same native content page may be compiled into different machine code depending on the target platform.

At block 410, the process 400 provides the content page as machine code to the user device 102. In an embodiment where the compiler 122A of the browser/shell 120 compiles the content page into machine code, the machine code may be transferred to the local content processing module 122 to be setup for execution as a new page process. In an embodiment where the remote content processing module 150 is responsible for accessing and/or compiling the content page, the intermediary browser 140 may provide the compiled machine code to the browser/shell 120 on the user device 102 for subsequent execution.

At block 412, the process 400 optionally causes execution of the content page machine code as a process, such as a compiled page/application 130 illustrated and described with reference to FIG. 2. The process may be executed for example by the operating system software running on the user device 102.

Example Content Page Dynamic Re-Compilation Process

Figure 5:
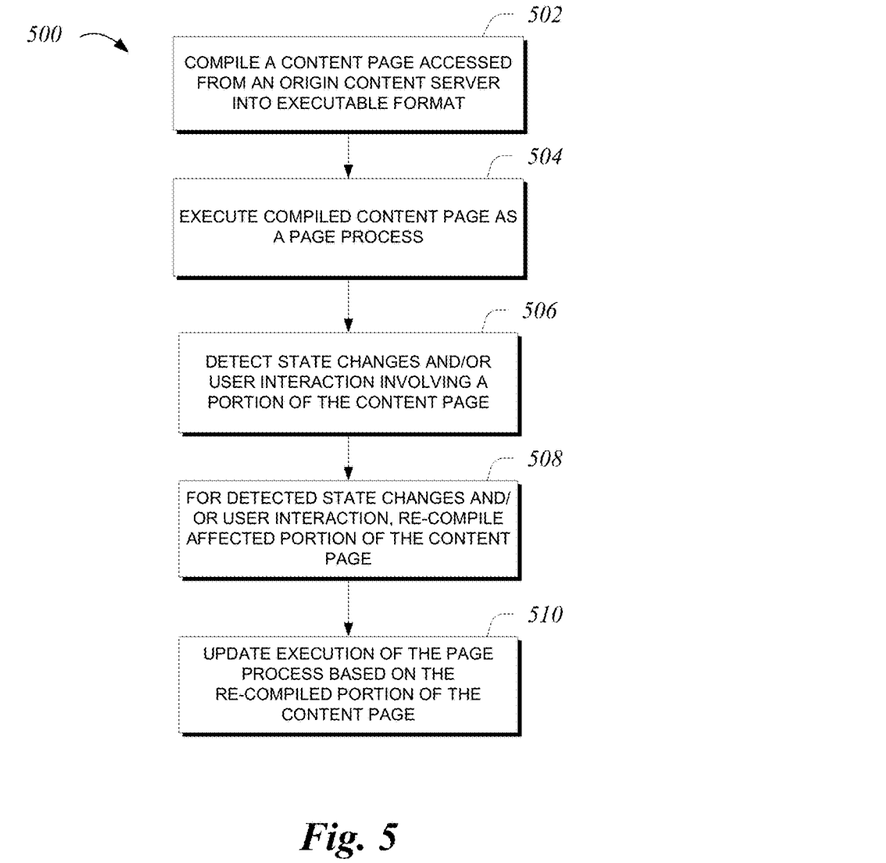
FIG. 5 is a flowchart of an embodiment of a content page re-compilation process as implemented by a user device, such as the user device of FIG. 2, or by an intermediary system, such as the intermediary system of FIG. 3.

FIG. 5 is a flowchart of an embodiment of a content page re-compilation process as implemented by a user device, such as the user device of FIG. 2, or by an intermediary system, such as the intermediary system of FIG. 3. The process 500 can be implemented by any system that can detect state changes in a running process and/or receive user interaction data, and can provide a response to the state changes or user interaction. For example the process 400, in whole or in part, can be implemented by a user device 102, a browser/shell 120, a local content processing module 122, a compiler 122A, an intermediary system 104, an intermediary browser 140, or a remote content processing module 150, to name a few. Although any number of systems, in whole or in part, can implement the process 500, to simplify the discussion, portions of the process 500 will be described with reference to particular systems. Further, although the process 500 is primarily described with respect to the user device 102 or the intermediary system 104 and their associated subsystems, in some embodiments the process 500 may be performed by a host system of a content page, such as an origin content server 106.

The process 500 begins at the block 502 where, a content page accessed from an origin content server 106 (or from a CDN server 108) is compiled into an executable format. This process may be performed, for example, as described with reference to the process 400 of FIG. 4. Alternatively and in some embodiments, at block 502 a pre-compiled version of the content page may be accessed, for example, from the cache 128 on the user device 102, from the cache 142 on the intermediary system 104, or from another repository which may store pre-compiled versions of content pages.

At block 504, the process 500 executes, or causes execution of, the compiled content page as a page process (for example, as a compiled page/application 130 as illustrated and described with reference to FIG. 2). For example, the local content processing module 122 may instruct operating system software on the user device 102 to execute the executable format of the content page as a standalone process separate from the browser/shell 120.

At block 506, the process 500 detects state changes and/or user interaction involving at least a portion of the content page. For example, state changes may include new user interface elements which may need to be configured or displayed, which may be based in part on user interaction with the content page application or executing process. User interaction data include for example a user interacting with a particular user interface control element presented in the content page, such as, among other things, to provide input or to select a link to a second content page (which may trigger access, compilation, and execution of the second content page).

At block 508, the process 500 re-compiles any portion of the content page affected by the detected state change or user interaction. This may be necessary because, in some instances, the original compiled machine code for the content page may become invalid based on the updated state change or user interaction. In some instances the state change or user interaction may correspond to only a portion of the content page, and as such only the affected portion of the underlying content page may need to be re-compiled. In an embodiment involving the intermediary system 104, the interaction processing module 152 may be responsible for receiving updated state and user interaction data from the user device 102 and instructing the remote content processing module 150 to perform any re-compilation that may be necessary in response.

At block 510, the process 500 updates execution of the page process based on the re-compiled portion of the content page. For example, in instances where the machine code comprises binary files, then one or more of the binary files may be replaced by the re-compiled portion of the content page in order to propagate the change to the compiled page/application 130 at runtime.

Examples of Compiled Content Page Viewed on a User Device

Figure 6A:
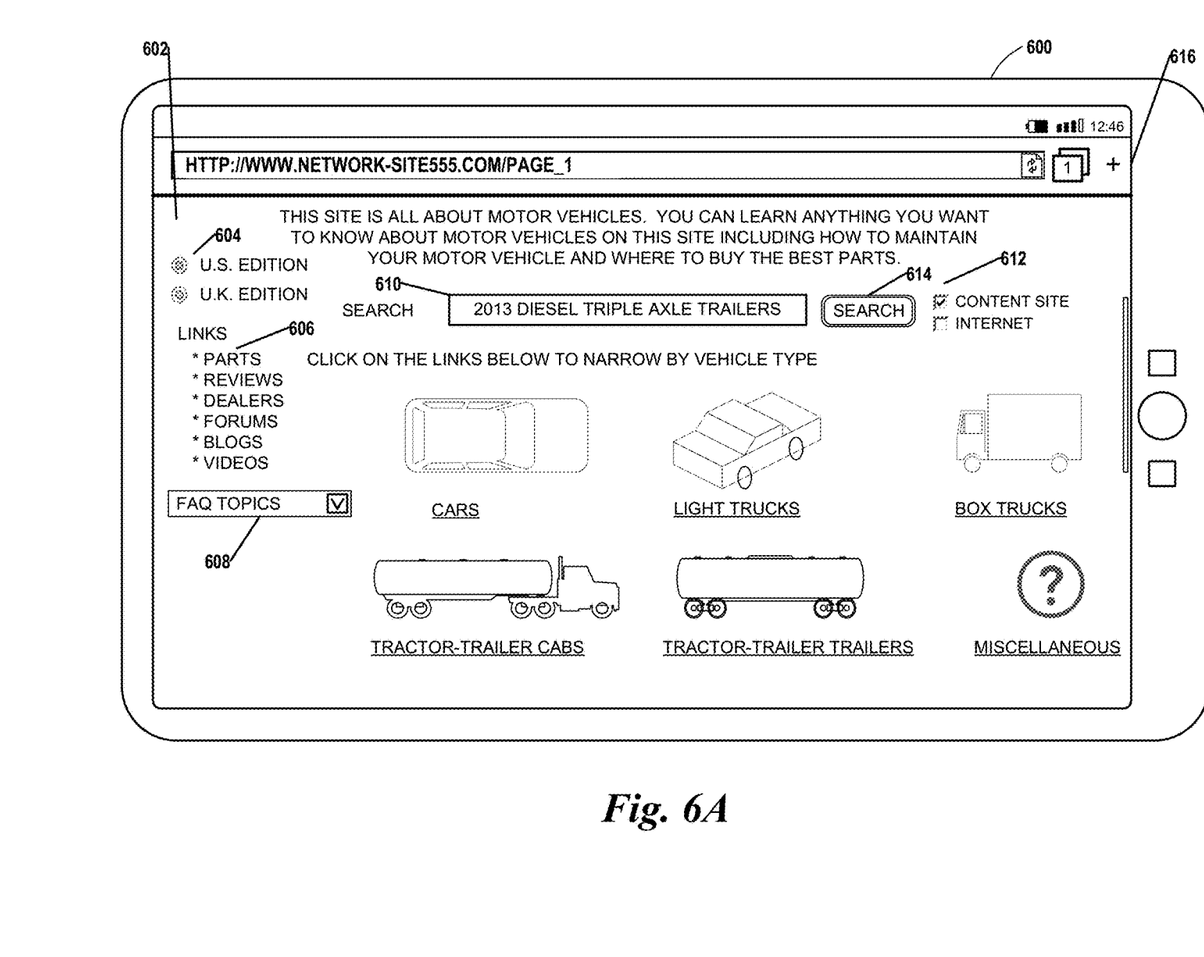
FIG. 6A illustrates an example of a content page that can be provided using the content processing techniques described herein.

FIG. 6A illustrates an example of a content page viewed on a tablet computing device 600. This tablet computing device 600 may be an instance of a user device 102, and may include one or more of the embodiments described above with respect to the user device 102. Further, the tablet computing device 600 may be configured to perform one or more of the processes described herein, such as the processes 400 and 500.

In the example depicted in FIG. 6A, the tablet computing device 600 requests the content page 602 from one or more systems hosting the content page 602, such as the origin content server 106 and/or one or more CDN servers 108. The content page 602 may include a number of different types of elements or content resources that are loaded and/or processed by the tablet computing device 600. For example, the content page 602 may include scripts (e.g., JavaScript), animations, images, text, links, Active Server Pages (ASP), etc. In addition, the content page 602 may include a number of controls, including a number of user interface elements. For example, the content page includes radio buttons 604, links or hyperlinks 606, a drop-down box 608, a text box 610, checkboxes 612, and a button 614. Those of skill in the art will recognize that other controls and user interface elements are possible, such as spinners, list boxes, scrollbars, sliders, combo boxes, etc. Accessing the various elements from the system or systems hosting the content page 602 and loading them on the tablet computing device 600 may be a resource intensive process and, depending on the network connection, may take several seconds if not longer for a content page with a number of resources. In addition, some content pages may have a large number of resources which consume memory once loaded by the tablet computing device 600. Depending on the available memory on the tablet computing device 600, only a relatively small, limited number of content pages may be able to be loaded before the available memory is consumed.

As described herein, to reduce memory load and increase resource allocation efficiency and performance, the table computing device 600 may be installed or configured with the browser/shell 120 (for example, as illustrated and described with reference to FIG. 2 herein). The browser/shell 120 may analyze the content page 602 and its associated resources and generate a compiled machine code representation of the content page. The compiled machine code may then be executed by the tablet computing device 600 as an executing application or as a separate process. The executing application or process may be displayed to the user from within the browser/shell 120 or as a standalone application.

As described above, the content page 602 may be interactive and present a variety of user interface control elements. In some embodiments, and in accordance with the process 500 of FIG. 5, user interaction and/or state changes may be detected, for example by user input or interaction with user interface control elements detect. In response to detected user interaction and/or state changes, the browser/shell 120 may cause the compiler 122A to re-compile affected portions of the content page 600.

Once the content page has been re-compiled or the machine code updated, the re-compiled code for the content page may then be deployed to replace the existing compiled code (or in some cases, only a portion thereof, as the case may be with a number of discrete binary files). The updated, re-compiled code may then be executed by the page process running on the tablet computing device 600 to update the content page 602 to display any updated portions thereof.

FIG. 6A also includes one or more traditional browser input controls at display element 616, including for example a URL input box, a refresh button, a window or tab selector button, and a button to open a new window or tab. Each of these browser input controls may optionally be displayed with the content page 602 as shown in FIG. 6A, displayed in a different configuration, or not displayed at all depending on the embodiment. For example, since the content page 602 is executed in a separate process from the browser/shell 120, some of all of these browser input controls may not need to be displayed or may be implemented differently by the content page 602 itself, and so on.

Figure 6B:
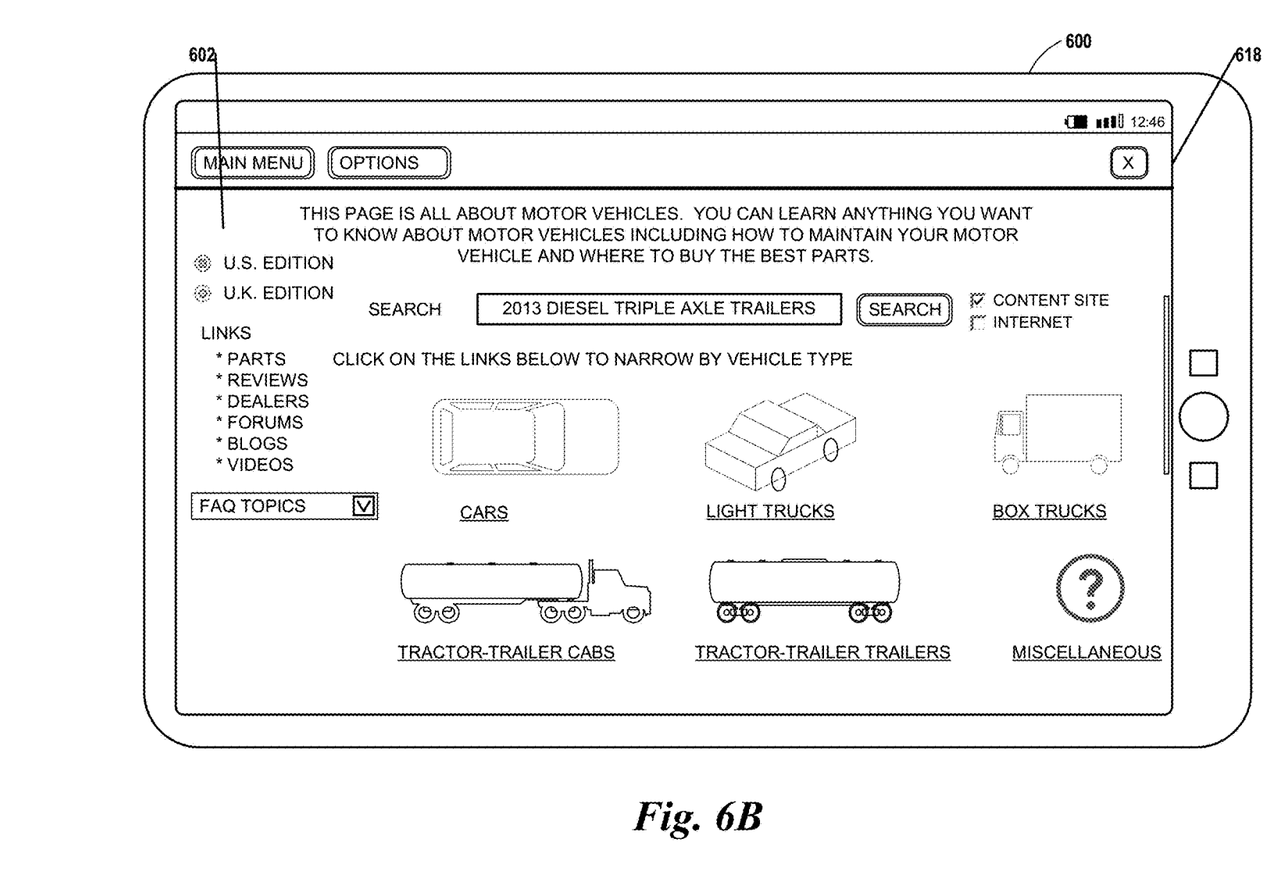
FIG. 6B illustrates an example of a content page that can be provided using the content processing techniques described herein.

FIG. 6B illustrates another example of the content page 602 viewed on a tablet computing device 600, in which the browser input controls shown in FIG. 6A have been replaced with different page controls at display element 618. For example, the URL input box, the refresh button, the window or tab selector button, and the button to open a new window or tab have all been replaced by a main menu button, an options button, and an "X" button by which the user may, for example, close the application which represents the content page 602. This example further demonstrates that, in some embodiments, the traditional browser application and associated user controls may not need to be displayed to the user when the compiled content page 602 is executed. For example, the content page 602 may actually be a compiled application that executes on the tablet computing device 600 separate and independently of a browser.

Terminology

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 3.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of providing a content page, the method comprising:
    as implemented by one or more computing devices configured with specific executable instructions,
    accessing, on behalf of a user computing device, a content page from a host system, the content page comprising associated metadata descriptive of content resources included in the content page;
    determining, based on the associated metadata, one or more content resources associated with the content page;
    determining a target platform associated with the user computing device, the target platform specifying at least a device type of the user computing device and an operating system installed on the user computing device;
    compiling the content page and the one or more content resources associated with the content page into machine code representing the content page, the content page being compiled according to the determined target platform such that the machine code representing the content page is configured for execution on the user computing device, wherein a code library is selected for compilation based, at least in part, on the target platform;
    causing the machine code representing the content page to be executed by the operating system installed on the user computing device as a separate process; and
    re-compiling at least a portion of the content page based on information indicating detected changes to the content page.

2. The method of claim 1, wherein the machine code representing the content page comprises one or more executable files or a standalone application.

3. The method of claim 1, wherein the target platform is determined based at least in part on one or more device attributes accessed from the user computing device.

4. The method of claim 1, wherein the one or more content resources associated with the content page includes one or more of hypertext markup language files, JavaScript files, cascading style sheet files, image files, or media content files.

5. A system comprising:
    an intermediary system comprising computer hardware configured to at least:
    retrieve a content page from a host system, the content page comprising associated metadata descriptive of one or more content resources associated with the content page;
    determine a target platform for which a compiled code version of the content page is to be generated, the target platform specifying at least an operating system type, wherein a code library is selected for compilation based, at least in part, on the target platform;

generate the compiled code version of the content page and the one or more content resources associated with the content page, the content page being compiled according to the determined target platform, the compiled code version comprising machine code representative of the content page, the machine code configured for execution by the operating system type; and provide, to a user computing device, the compiled code version of the content page, the user computing device configured to cause the compiled code version of the content page to be executed by an operating system installed on the user computing device in a separate process, wherein at least a portion of the content page is re-compiled based on information indicating detected changes to the content page.

6. The system of claim 5, wherein the content page is retrieved on behalf of the user computing device in response to a request for the content page, the request received by the intermediary system.

7. The system of claim 6, wherein the target platform is determined based in part on one or more device attributes received with the request for the content page.

8. The system of claim 5, wherein the one or more content resources associated with the content page includes at least one of a hypertext markup language file, a JavaScript file, a cascading style sheet file, an image file, or a media content file.

9. The system of claim 5, wherein the machine code comprises one or more executable files.

10. The system of claim 5, wherein the machine code is a standalone application.

11. The system of claim 5, wherein to generate the compiled code version of the content page and the one or more content resources associated with the content page, the intermediary system is further configured to:
　link, with the content page, the code library executable on the target platform; and
　compile the content page, the one or more content resources, and the code library into an executable application.

12. The system of claim 11, wherein the code library is selected based at least in part on the associated metadata for the content page.

13. The system of claim 5, wherein the content page is accessed independently of a request for the content page.

14. The system of claim 5, wherein the intermediary system is further configured to:
　receive, from the user computing device, user interaction data indicative of a state change for a respective portion of the content page;
　generate, based on the user interaction data, a re-compiled code version of the content page and the one or more content resources associated with the content page; and
　provide to the user computing device, the re-compiled code version of the content page, the user computing device configured to cause the re-compiled code version of the content page to be executed by the operating system installed on the user computing device in the separate process.

15. A method of providing a content page, the method comprising:
　accessing, by an intermediary computing system comprising computer hardware, a content page from a host system, the content page comprising associated metadata descriptive of one or more content resources associated with the content page;
　determining a target platform for which a compiled code version of the content page is to be generated, wherein a code library is selected for compilation based, at least in part, on the target platform
　generating, according to the determined target platform, the compiled code version of the content page and the one or more content resources associated with the content page, the compiled code version comprising machine code representative of the content page, the machine code configured for execution on the target platform; and
　responsive to a request for the content page received from a user computing device, providing, to the user computing device, the compiled code version of the content page for execution by an operating system installed on the user computing device,
　wherein at least a portion of the content page is re-compiled based on information indicating detected changes to the content page.

16. The method of claim 15, wherein the target platform specifies at least a target device type and a target operating system.

17. The method of claim 15, wherein the target platform is determined based in part on one or more device attributes received with the request for the content page.

18. The method of claim 15, wherein the machine code comprises one or more executable files.

19. The method of claim 15, wherein generating the compiled code version of the content page and the one or more content resources associated with the content page further comprises:
　linking, with the content page, the code library executable on the target platform; and
　compiling the content page, the one or more content resources, and the code library into an executable application.

20. The method of claim 19, wherein the code library is selected based at least in part on the associated metadata for the content page.

21. The method of claim 15, further comprising:
　receiving, from the user computing device, state change data indicative of a state change for a respective portion of the content page;
　generating a re-compiled code version of a portion of the content page based on the state change data; and
　providing, to the user computing device, the re-compiled code version of portion of the content page for execution by the operating system installed on the user computing device.

22. A non-transitory computer-readable medium storing computer executable instructions that, when executed by a user computing device, configure the user computing device to perform operations comprising:
　accessing, by a browser component on the user computing device, a content page from a host system, the content page being associated with a content server, and the content page comprising: associated metadata descriptive of one or more content resources associated with the content page, and a reference associated with a different content page;
　determining, based at least in part on attributes associated with the user computing device, a target platform for which a machine code version of the content page is to be compiled;
　compiling the machine code version of the content page and the one or more content resources associated with the content page, the content page being compiled according to the determined target platform, the machine code representative of the content page, the machine code configured for execution on the target platform, wherein a code library is selected for compilation based, at least in part, on the target platform;

causing execution of the machine code by an operating system installed on the user computing device in a page process separate from the browser component;

wherein upon user selection of the reference, machine code associated with the different content page is executed in a particular page process selected based, at least in part, on a content server associated with the different content page.

23. The non-transitory computer-readable medium of claim 22, wherein the machine code comprises one or more binary files.

24. The non-transitory computer-readable medium of claim 22, wherein the target platform specifies at least a device type of the user computing device and the operating system installed on the user computing device.

25. The non-transitory computer-readable medium of claim 22, wherein compiling the machine code version of the content page and the one or more content resources associated with the content page further comprises linking in the code library comprising code executable on the target platform.

26. The non-transitory computer-readable medium of claim 22, wherein the operations further comprise:

causing execution of the machine code associated with the different content page in the page process based on the different content page being associated with the content server, or causing execution of the machine code associated with the different content page in a different page process based on the different content page being associated with a different content server than the content server.

* * * * *